United States Patent
Wu et al.

(10) Patent No.: US 6,862,152 B2
(45) Date of Patent: Mar. 1, 2005

(54) ADJUSTMENT OF POLE FREQUENCY AND BOOST SETTINGS OF A FILTER IN A CHANNEL

(75) Inventors: DetHau Wu, Singapore (SG); Edmun ChianSong Seng, Singapore (SG); Utt Heng Kan, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 190 days.

(21) Appl. No.: 10/374,419

(22) Filed: Feb. 25, 2003

(65) Prior Publication Data

US 2004/0165303 A1 Aug. 26, 2004

(51) Int. Cl.⁷ ............................. G11B 5/035; G11B 5/02
(52) U.S. Cl. ............................................ 360/65; 360/67
(58) Field of Search ............................ 360/25, 31, 46, 360/67, 65, 54

(56) References Cited

U.S. PATENT DOCUMENTS

| | | | |
|---|---|---|---|
| 4,940,977 A | * | 7/1990 | Mandell ..................... 341/143 |
| 5,121,260 A | | 6/1992 | Asakawa et al. |
| 5,327,302 A | * | 7/1994 | Khoury et al. ................ 360/65 |
| 5,625,317 A | | 4/1997 | Deveirman |
| 6,005,731 A | * | 12/1999 | Foland et al. ................ 360/53 |
| 6,429,988 B1 | * | 8/2002 | Bhaumik et al. ............ 360/46 |
| 6,594,094 B2 | * | 7/2003 | Rae et al. ..................... 360/25 |
| 2002/0031067 A1 | | 3/2002 | Van Woundenberg et al. |
| 2002/0075584 A1 | | 6/2002 | Patti |
| 2002/0154430 A1 | | 10/2002 | Rae et al. |
| 2002/0176190 A1 | | 11/2002 | Cyrusian |
| 2002/0181573 A1 | | 12/2002 | Dohmen et al. |

OTHER PUBLICATIONS

IEEE Tranactions on Magnetics– Written on Sep. 1997 vol. 33 No. 5—Part 1 of 3– Published in New Orleans Louisiana.

* cited by examiner

Primary Examiner—W. R. Young
Assistant Examiner—Adam R. Giesy
(74) Attorney, Agent, or Firm—Kirk A. Cesari

(57) ABSTRACT

A channel adjustment control adjusts a channel to reduce bit error rate in a disc drive. Variable gain register settings are read and compared to filter characteristics to provide an operational boost register setting for an adjustable gain amplifier in the channel. An operational pole register setting is provided based on the operational boost register setting and known parameters of the adjustable low pass filter. Low and high frequency data patterns are applied while the channel adjustment control reads the variable gain register settings.

39 Claims, 12 Drawing Sheets

ADJUSTMENT OF POLE FREQUENCY AND BOOST SETTINGS OF A FILTER IN A CHANNEL

FIELD OF THE INVENTION

The present invention relates generally to communication channels, and more particularly, but not by limitation, to adjusting read channels in disc drives.

BACKGROUND OF THE INVENTION

In high density magnetic recording that utilizes a most likelihood (ML) detection algorithm, adjusting equalization of the read back signals to a predetermined target waveform is typically performed by both a continuous time filter (CTF) and a finite impulse response (FIR) filter in a read channel. The CTF is a adjustable low pass filter with programmable pole frequency and boost. The CTF filters out high frequency noise and also equalizes the read back waveform to provide a target waveshape. In order to achieve the best bit error rate (BER), the optimum settings for both the pole frequency ($F_{POLE}$) and the boost ($F_B$) of the CTF are set based on numerous bit error rate measurements. Collecting BER measurements for many different pole and boost settings is time consuming and causes a bottleneck in the production line for disc drives. A method and apparatus are needed to adjust the pole frequency and boost setting for the adjustable low pass filter in a way that avoids collecting BER measurements on the production line and that speeds up the process of adjusting boost and pole frequencies for channels, including disc drive read channels.

SUMMARY OF THE INVENTION

Disclosed are a method and a channel adjustment control for adjusting a channel to reduce bit error rate. The channel adjustment control comprises a first control portion that reads variable gain register settings in the channel, and that provides an operational boost setting for an adjustable low pass filter in the channel. The first control portion adjusts the operational boost register setting by comparing variable gain register settings to filter characteristics.

The channel adjustment control also includes a second control portion that provides an operational pole register setting for the adjustable low pass filter. The second control portion adjusts the operational pole register setting based on the operational boost setting and known parameters of the adjustable low pass filter.

The channel adjustment control also includes a third control portion that applies low and high frequency data patterns while the first control portion reads the variable gain register settings.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
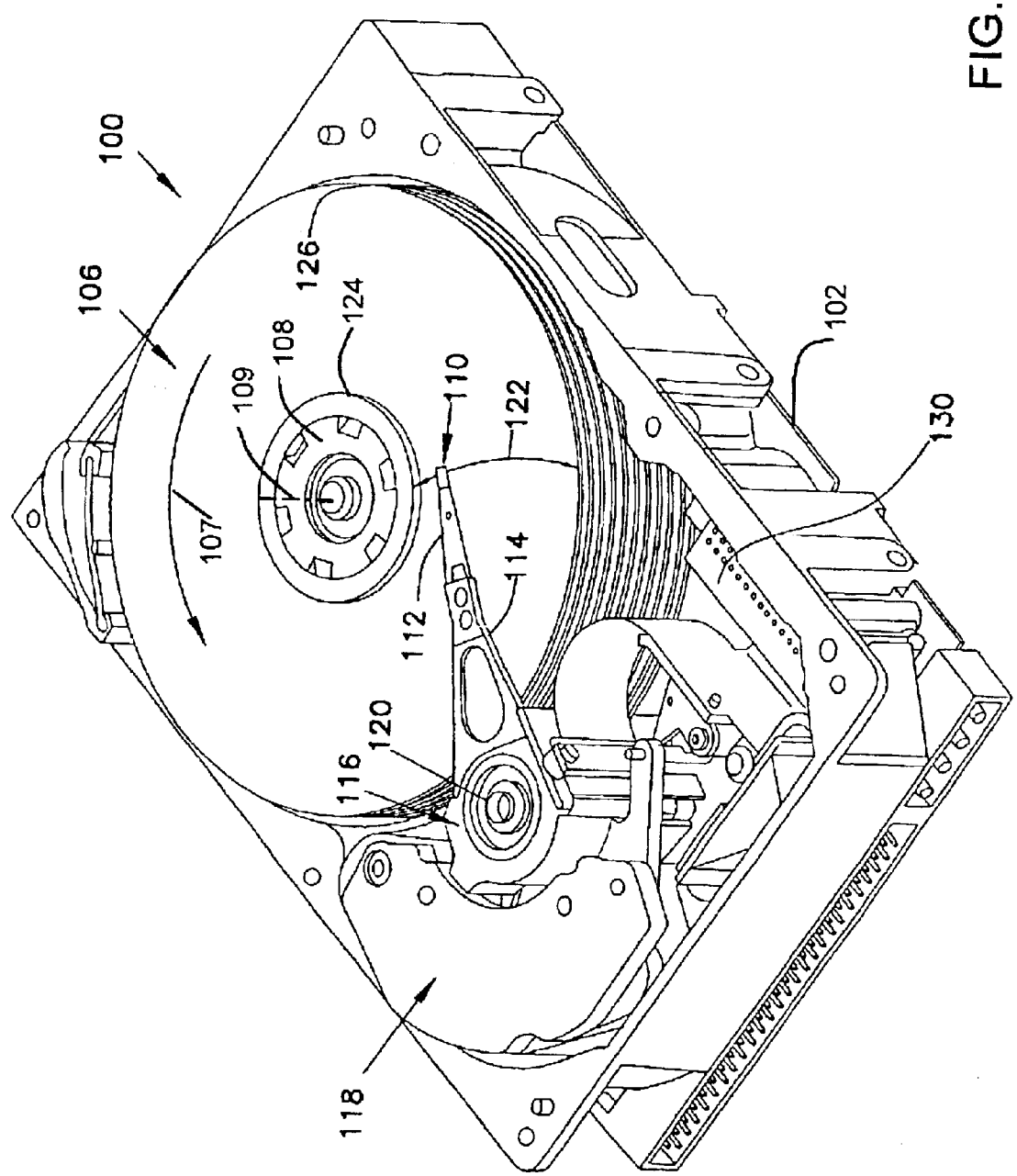
FIG. 1 illustrates an oblique view of a disc drive.

In the embodiments described below, a channel includes a low pass, continuous time filter that has an adjustable boost register setting and an adjustable pole frequency register setting. During a test time interval, the adjustable pole frequency register setting is temporarily set to provide maximum bandwidth and the adjustable boost register setting is temporarily set to its lowest value of boost. This temporarily provides an essentially flat frequency response over a full range of data frequencies. Lower frequency and higher frequency data patterns are then applied to the read channel. A variable gain amplifier (VGA) in the read channel has lower and higher frequency variable gain register settings corresponding to the lower and higher frequency data patterns that are read. An operational boost register setting is then calculated from the lower and higher frequency variable gain register settings by referring to stored data on filter characteristics. The calculated operational boost register setting is then used to set the adjustable boost register to the operational boost register setting.

With the operational boost register setting thus set for the adjustable low pass filter, an operating pole register setting is selected that provides a low BER, and the operating pole register setting is then set for the adjustable low pass filter. The operational pole register setting is selected based on the operational boost register setting and the known parameters of the adjustable low pass filter. The amount of data collection needed to ascertain the operating boost register and operating pole register setting for a production channel is reduced. With the disclosed arrangement and method, there is no need to collect any BER data on each channel and a sensor coupled to the channel input. Adjustment of the adjustable low pass filter can be completed rapidly. Instead of measuring a large amount of bit error rate data, the present arrangement measures two variable gain register settings. The channel can be adjusted in a short period of time, increasing production throughput. The disclosed arrangement can be applied, for example, to a read channel in a disc drive.

In production, each read head has a slightly different gain vs. frequency characteristic due to manufacturing process variations. The read channel is used to indirectly test the frequency characteristic of the read head. The adjustable low pass filter is set to a flat (unboosted) shape and maximum bandwidth so there is essentially no equalization for the test of the head. Then 8T and 2T patterns are read using the head. For each pattern, an automatic gain control feedback loop adjusts the variable gain amplifier register to get a constant level at an ADC output. The 2T/8T ratio of variable gain amplifier register settings indicates read/write head frequency characteristics for which equalization (i.e. operational boost and pole settings) is desired during operation.

In the read channel, the variable gain amplifier, adjustable low pass filter and FIR are part of a closed loop system. If the adjustable low pass filter is set to flat, the variable gain amplifier provides the needed amplification.

There are two reasons for using the adjustable low pass filter. First, the adjustable low pass filter filters out high frequencies noise. Second, the variable gain amplifier will amplify all signals equally, regardless of their frequencies. On the other hand, the amplification from the adjustable low pass filter is a function of the signals frequency if a non-zero boost is set (discussed below in connection with FIG. 6). The signals need to be amplified according to their frequencies. The user data that stored on the disk is random and the frequency spectrum of the operational read back waveform spreads from 0 to 0.5 of the channel frequency. The amplitude of the low frequency signal is usually higher than that of the high frequency signal. Hence, the amplification required by the low frequency signal is smaller compared to that by the high frequency signal. The adjustable low pass filter will provide the required amplification according to the signal frequencies. However, the boost of the adjustable low pass filter is correctly set so that the signals of all frequencies can be amplified correctly. In order to determine what boost to set to the adjustable low pass filter, there is a need to know what are the gains required by the high and low frequency signals.

To measure the required gain, the 2T and 8T patterns are read and the change in the variable gain amplifier setting is observed (the boost of the adjustable low pass filter at this time is set to zero so that the signals are compared based on the same level). Here, the 2T pattern represents the high frequency signal while the 8T is the low frequency signal.

Figure 8:
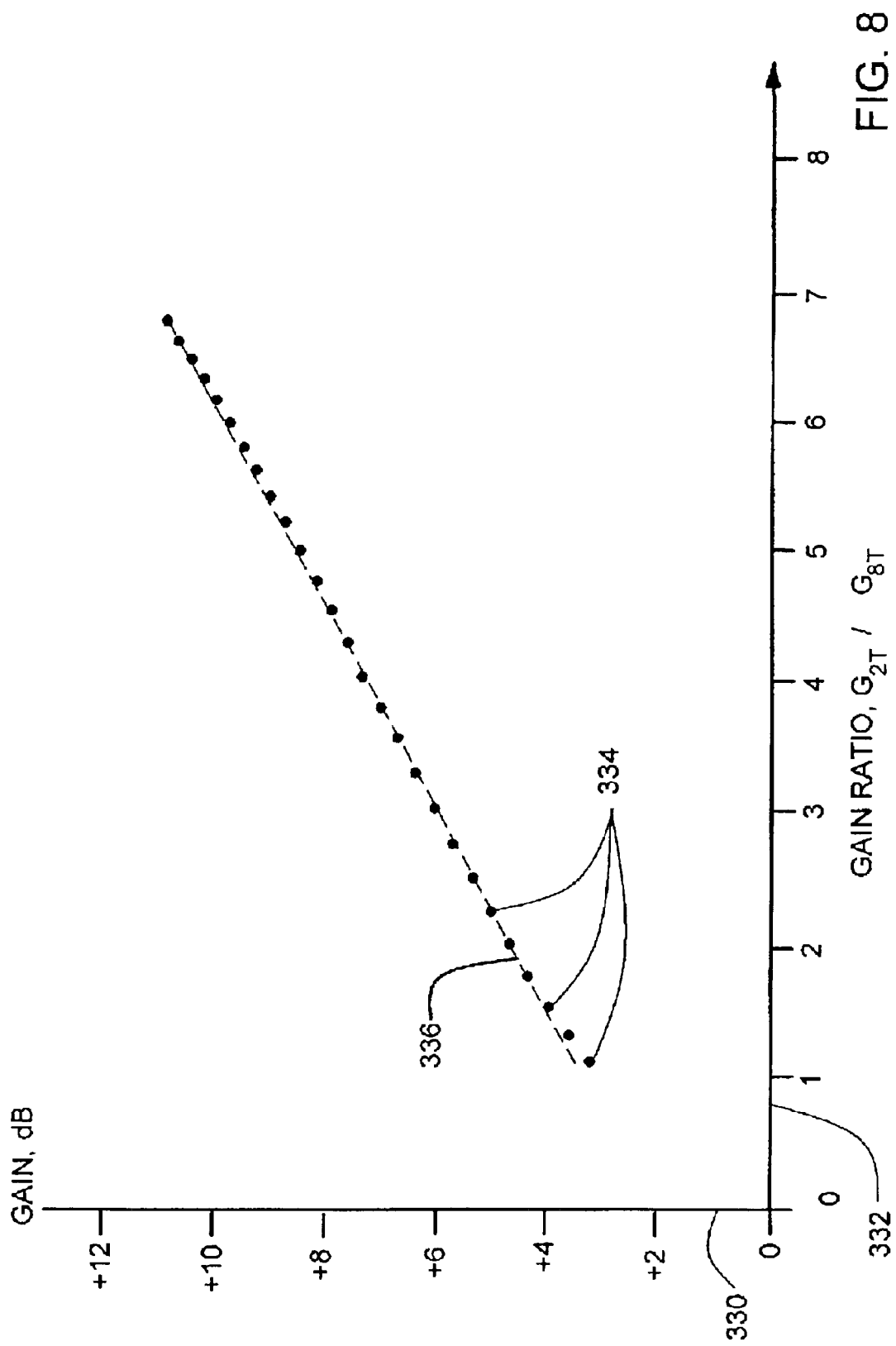
FIG. 8 illustrates a relationship between a boost and a variable gain amplifier gain ratio for 2T and 8T frequency data patterns.

Once the gain ratio of the 2T and 8T signals is obtained (from the change in the variable gain amplifier setting), the boost can be determined by using information such as that shown in FIG. 8. FIG. 8 is data that shows amount of boost needed equalize the gain ratio. The data in FIG. 8 can be calculated from the adjustable low pass filter transfer function.

FIG. 1 is an oblique view of a disc drive 100 in which embodiments of the present invention are useful for adjusting a read channel. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation in a direction indicated by arrow 107 about central axis 109. Each disc surface has an associated disc read/write head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached read/write heads 110 about a pivot shaft 120 to position read/write heads 110 over a desired data track along an arcuate path 122 between a disc inner diameter 124 and a disc outer diameter 126. Voice coil motor 118 is driven by electronics 130 based on signals generated by read/write heads 110 and a host computer (not shown). The electronics 130 also includes a read channel that includes a variable gain amplifier and an adjustable low pass filter (not separately illustrated in FIG. 1). The read channel is adjusted as part of a manufacturing process. Examples of channel adjustments are described below in connection with examples shown in FIGS. 3–12.

Figure 2:
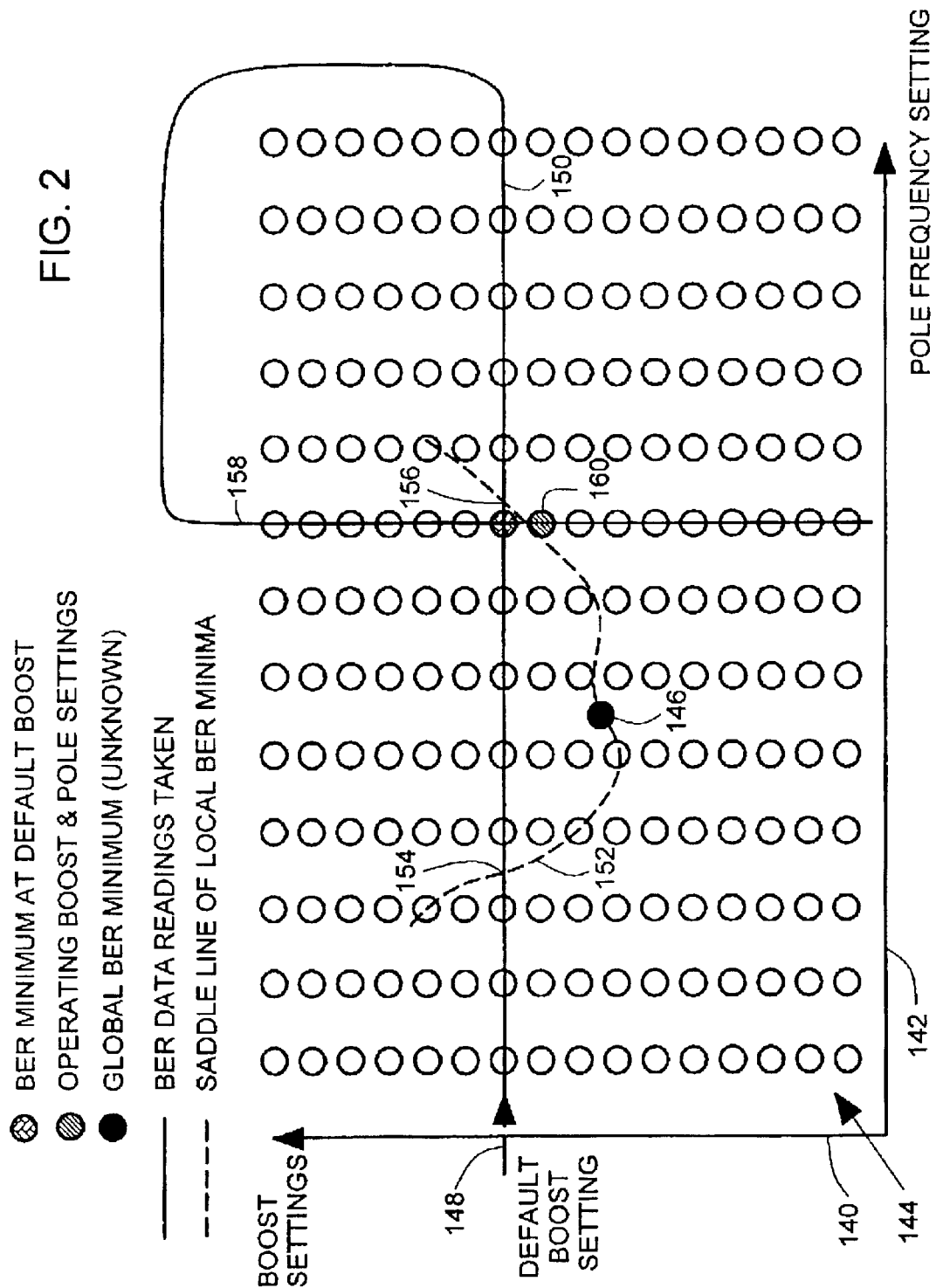
FIG. 2 illustrates a method of adjusting a read channel in a disc drive using measurements of bit error rate.

FIG. 2 illustrates an alternate method of adjusting a read channel in a disc drive using measurements of bit error rate. In FIG. 2, a vertical axis 140 represents numeric values of boost settings and a horizontal axis 142 represents numeric values of pole frequency settings for a continuous time adjustable low pass filter in a read channel of a disc drive. A 13×16 array of small circles 144 represent measurements of bit error rate (BER) at the boost and pole frequency coordinates associated with each small circle 144. A 13×16 array is shown merely for illustrative purposes, however, it will be understood that larger arrays of BER data are used in practice. A globally minimum or optimum combination of pole frequency and boost settings is represented by a solid black circle at 146. This optimum combination is generally unknown until after BER measurements are made.

In one "direct" alternate method of optimizing the adjustable low pass filter, very time consuming measurements are made of all BER measurements for substantially all pole frequency and boost combinations in the array. The pole and boost settings that provide the best BER performance are then chosen as operational pole and boost settings. This "direct" method of tuning is very time consuming since a large amount of BER data needs to be collected.

In order to somewhat reduce the tuning time, a "simplified" alternate version of the above method is used. First, the value for the boost is fixed to a default value 148 and then BER measurements are collected for all 13 pole frequency settings along horizontal line segment 150. The horizontal line segment 150 may intersect a saddle line 152 of local BER minima at one or more intersections 154, 156. There may be one or more intersections depending of the BER characteristics found in the disc drive. A pole setting that corresponds to the best BER performance is chosen and is represented by vertical line segment 158. Then, 16 multiple BER measurements are taken along vertical line segment 158. With the selected pole setting along vertical line segment 158, a local optimized boost setting is sought and a final operational pole frequency and boost setting is selected at 160. A pitfall of this "simplified" alternate method is that the 'goodness' of local BER minima at the selected pole and boost depends on the default value of Fb that the operator uses. There is no systematic way of finding the best default value and searching for the default settings is a laborious and hit-or-miss process and can end up with operational settings that are far removed from the global optimum 146. The problems with the alternate methods illustrated in FIG. 2 are overcome by the arrangements described below in connection with FIGS. 3–12.

Figure 3:
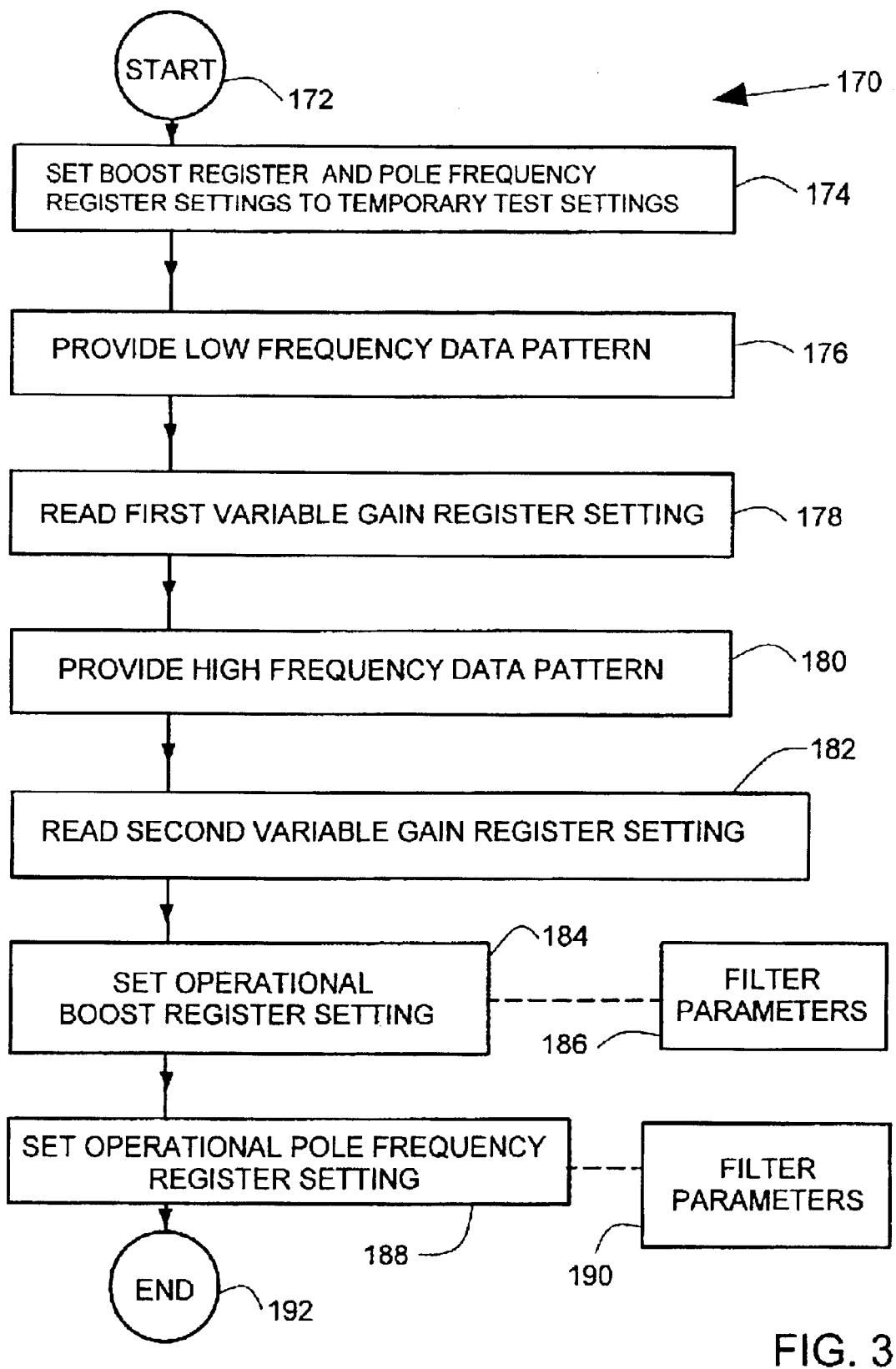
FIG. 3 illustrates a method of adjusting a communication channel without making bit error rate measurements.

FIG. 3 illustrates a flow chart 170 of a method of adjusting a channel to provide low bit error rate (BER) performance. The method illustrated in FIG. 3 can be applied to a read channel in a disc drive and is also generally applicable to suitable data channels or communication channels in data storage applications as well as other applications. The method illustrated in FIG. 3 can be completed rapidly without making any actual bit error rate measurements on a channel and an associated sensor connected to the channel input. The process illustrated in FIG. 3 can be performed using firmware (or a combination of firmware and software) such as shown in the examples illustrated in FIGS. 4–5 to adjust a read channel. FIG. 5 can be joined to FIG. 4 along the dotted lines 206, 208 to provide a better understanding of application example of a channel adjustment control to adjusting a read channel in a disc drive.

The method illustrated in FIG. 3 starts at a start 172 and proceeds to a process 174 of setting a boost register setting to a test boost setting and setting a pole frequency register to a test pole setting for an adjustable low pass filter in the channel. Setting the test boost setting to zero and the test pole frequency to maximum ensures that an adjustable low pass filter (such as low pass filter 238 in FIG. 5) has a constant gain for signals with any frequency in the normal operating range of data frequencies. With these test settings established, the method next proceeds to a process 176 of applying a lower frequency data pattern (such as a low frequency data pattern stored at 210 in FIG. 4) to a channel (such as read channel 202 in FIG. 5), and then to a process 178 of reading a first variable gain register setting (such as on line 254 in FIG. 5) in the channel while the lower frequency data pattern is applied to the channel. With the test settings of step 174 still established, the method next proceeds to a process 180 of providing a higher frequency data pattern (such as a higher frequency data pattern stored at 210 in FIG. 4) to the channel, and then to a process 182 of reading a second variable gain register setting (such as on line 254 in FIG. 5) in the channel while the higher frequency data pattern is provided to the channel.

Next, at process 184, stored filter parameters 186 are accessed and the boost register (such as boost register 257 in FIG. 4) is set to an operational boost setting based on the filter parameters. The filter parameters relate filter operational boost settings with first and second variable gain register settings. An example of the filter parameters 186 is described below in connection with FIG. 8.

Next, at process 188 in FIG. 3, the pole frequency register (such as pole frequency register 259 in FIG. 4) is adjusted to an operational pole setting based on the operational boost setting (established in process 184) and access to known parameters 190 of the adjustable low pass filter to provide a reduced bit error rate. Examples of known parameters 190 of an adjustable low pass filter are described below in connection with FIG. 9. The process 170 is ended at an end 192 with operational pole frequency register and operational boost register settings set to near a global optimum bit error rate for the disc drive. The process 170 is completed rapidly without the need to make bit error rate measurements and does not present a bottleneck to channel manufacturing operations. The arrangement simply reads variable gain register settings with higher and lower data frequencies applied rather than measuring a large quantity of bit error rate data. The process 170 illustrated in FIG. 3 is described in more detail below in connection with an example illustrated in FIGS. 4–5.

Figure 4:
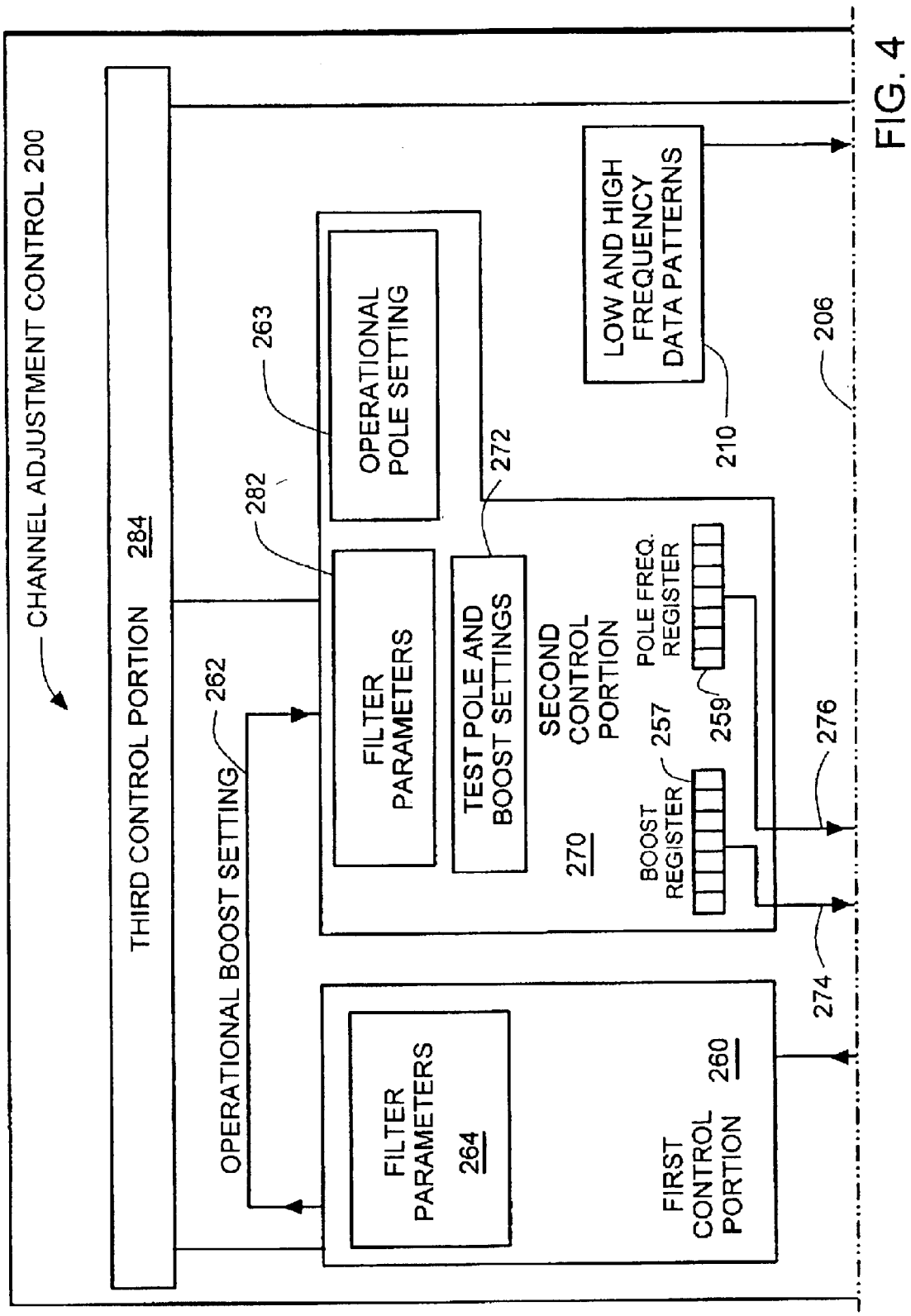
FIG. 4 illustrates a block diagram of a channel adjustment control.
Figure 5:
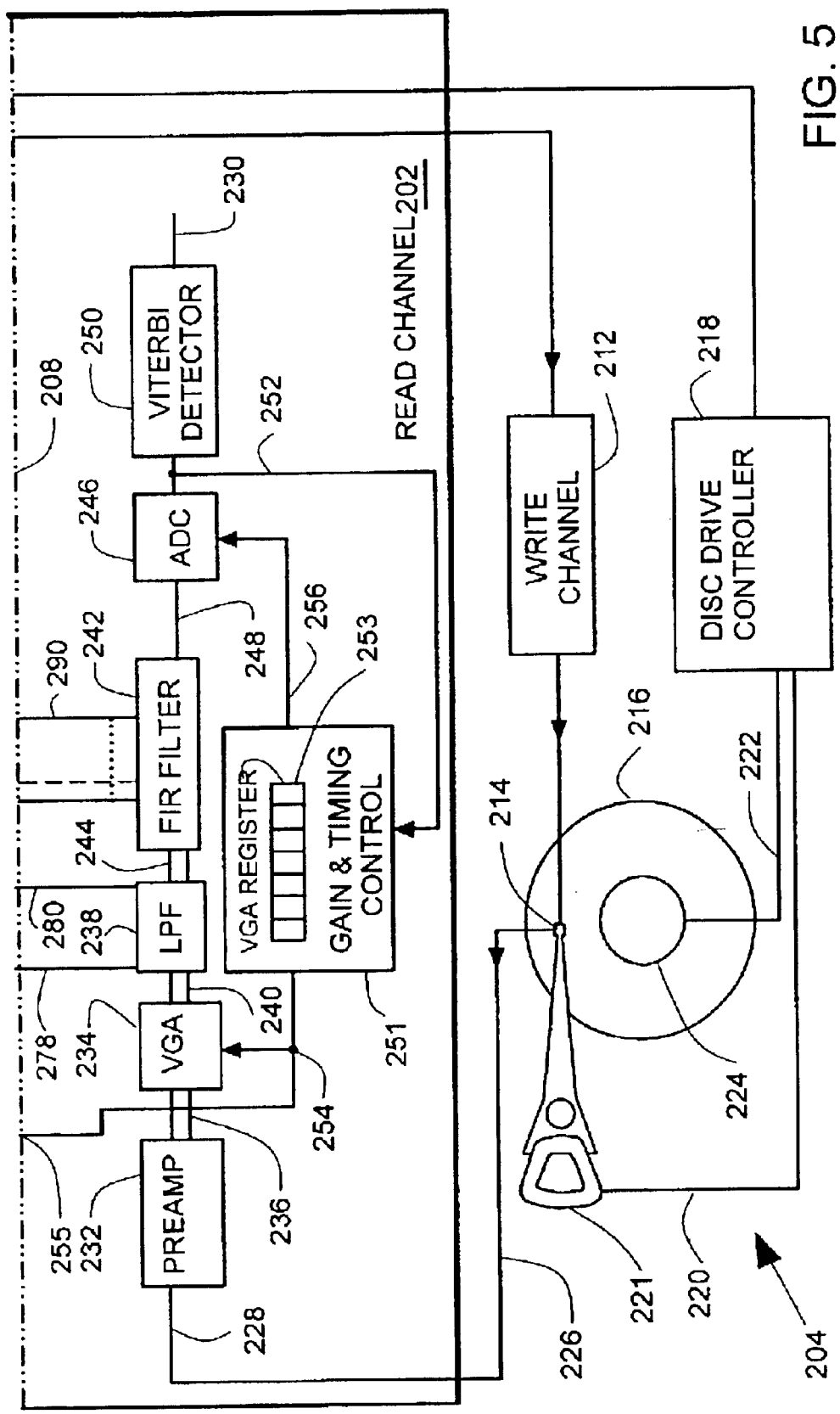
FIG. 5 illustrates a block diagram of a disc drive with an adjustable read channel.

FIG. 4 illustrates a block diagram of a channel adjustment control 200. FIG. 5 illustrates a block diagram of a disc drive with an adjustable read channel. FIG. 4 can be arranged above FIG. 5 so that a dotted line 206 in FIG. 4 is aligned with a dotted line 208 in FIG. 5 to form a larger block diagram. While the channel adjustment control 200 is described below in connection with application to a read channel in a disc drive, it will be understood that the channel adjustment control 200 can be used to control channels for other applications where sensors or input data other than a read head are applied to an input of the channel.

The channel adjustment control 200 (FIG. 4) adjusts the settings of a low pass filter 238 (FIG. 5) in a read channel 202 of the disc drive 204 to reduce bit error rate. The channel adjustment control 200 comprises low and high frequency data patterns 210 that are stored for writing to a disc 216. In a preferred arrangement, as illustrated in FIGS. 4–5, the channel adjustment control 200 is realized as firmware that is integrated into the read channel circuitry 202 of disc drive 204.

It will be recognized by those skilled in the art that the channel adjustment control can alternatively be realized as a test fixture or separate device (not illustrated) that temporarily connects to a disc drive to complete adjustments. In the case of such an alternate separate device, a boost register 257 and a pole frequency register 259 are part of the disc drive and are not included in the alternate separate device.

The disc drive 204 includes a write channel 212 that receives the low and high frequency data patterns 210. The write channel 212 provides the data patterns 210 to a head 214 for writing on the magnetic storage disc 216 in the disc drive 204. The disc drive 204 includes a disc controller 218 that provides a control output 220 to a voice coil 221 to position the head 214. The disc controller 218 also provides an electrical drive 222 to a disc motor 224 that spins the disc 216.

The head 214 reads the low and high frequency data patterns 210 written on the disc 216 and couples the data patterns along a line 226 to a data input 228 of the read channel 202. The read channel 202 passes the data patterns 210 through a series of processing blocks that are arranged in cascade to provide a read channel output at 230. The cascaded processing blocks in the read channel include a preamplifier 232 that receives input 228, a variable gain amplifier (VGA) 234 that receives a preamplifier output 236, the adjustable low pass filter 238 that receives a variable gain amplifier output 240, a finite impulse response (FIR) filter is 242 that receives a low pass filter output 244, an analog-to-digital converter (ADC) 246 that receives a FIR filter output 248, and a viterbi detector 250 that receives an ADC output 252. The FIR filter 242 preferably has one fixed tap and several adaptive or adjustable taps 290.

An example of preferred frequency characteristics of the adjustable low pass filter 238 are described below in connection with FIG. 6. An example of preferred frequency characteristics of the FIR filter are described below in connection with FIG. 7. The viterbi detector 250 provides the read channel output 230. The read channel output 230 is used in normal disc drive operation to provide data that has been read from the disc 216 to a host computer system.

Access to the read channel output 230 is not required for making adjustments of the adjustable low pass filter 238, however, because bit error rate measurements are not required by the channel adjustment control 200. The read channel 202 also includes a gain and timing control 251 that reads the ADC output 252 and sets a variable gain register 253. The gain and timing control 251 also provides an output 256 that controls timing and other functions of the analog-to-digital converter 246. The gain and timing control 251 provides closed loop feedback within the read channel 202 to provide a signal at line 248 that has a magnitude that will ensure a high resolution output at the ADC output 252 to be passed on to the input of the viterbi detector 250.

In normal operation, the closed loop control provided by gain and timing control 251 sets the variable gain register 253 to compensate for different frequencies of data received at the input 228 of the read channel 202. The variable gain amplifier (VGA) 234 has a gain that is controlled by the variable gain register 253 based on the feedback from the analog-to-digital converter output 252. In other word, if the gain at the adjustable low pass filter 238 is altered, the variable gain amplifier 234 will compensate accordingly such that the overall transfer function remains unchanged. Based on this feature, the gain ratio of the high to low frequency signals is calculated using the variable gain register settings read on line 255. The gain ratio for the 2T to 8T frequency signals is calculated. From this gain ratio, the amount of boost is calculated using data such as that shown in FIG. 8. The relationship shown in FIG. 8 can be obtained by solving the transfer function of the adjustable low pass filter mathematically. Another method to obtain this relationship is by plotting the transfer function of the adjustable low pass filter for a particular boost setting. The gain ratio of 2T to 8T frequencies is then measured from this transfer function. This process is repeated for all possible boost setting.

The channel adjustment control 200 includes a first control portion 260 that connects to the line 255 and reads first and second variable gain register settings on line 255 in the read channel. The first control portion 260 provides an operational boost setting 262 to a boost register 257 for the adjustable low pass filter 238 in the read channel. The first control portion 260 adjusts the operational boost setting 262 based on a comparison of the first and second variable gain register settings (read at line 255) to stored filter characteristics 264. The stored filter characteristics 264 relates first and second variable gain register settings to operational boost settings. An example of filter characteristics 264 is described below in connection with FIG. 8.

Figure 9:
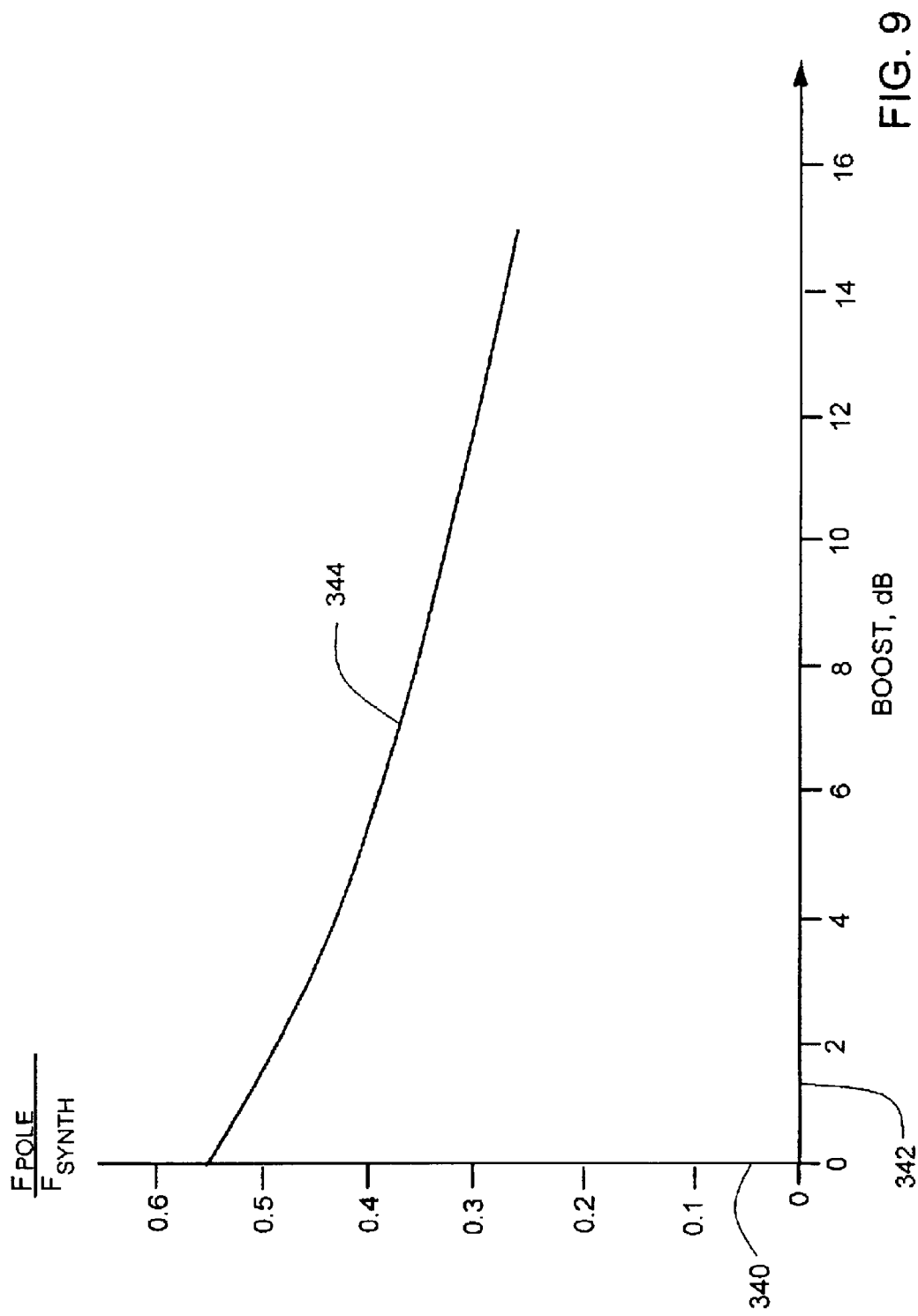
FIG. 9 illustrates a ratio $F_{POLE}/F_{SYNTH}$ as a function of an operational boost setting.

The channel adjustment control 200 also includes a second control portion 270. The second control portion 270 couples along lines 274, 276, 278, 280 to the adjustable low pass filter 238 in the read channel 202. The second control portion 270 provide test boost and pole settings 272 (temporarily written in boost register 257 and pole frequency register 259) during a test interval, and provides the operational boost setting 262 and an operational pole setting 263 to the registers 257, 259 after the test interval. The second control portion 270 calculates and sets the operational pole setting based on known parameters 282 for the type of adjustable low pass filter 238 that is used in the disc drive 204. An example of known parameters 282 is illustrated in FIG. 9.

The channel adjustment control 200 also includes a third control portion 284 that controls the disc drive 204 to read the first and second frequency data patterns 210 while the first control portion 260 reads the first and second variable gain register settings on line 255, respectively, during the test interval. The third control portion 284 controls the second control portion 270 after the test interval to provide the operational boost setting 262 and the operational pole setting 263 to the registers 257, 259.

In a preferred arrangement, the second control portion 270 provides temporary test settings 272 to the boost register 257 and the pole frequency register 259 that adjust the adjustable low pass filter 238 to provide a flat (unboosted), maximum bandwidth response while the disc drive 204 reads the low and high frequency data patterns 210. In a further preferred arrangement, the first control portion 260 reads the variable gain register settings on line 254 after the disc drive 204 performs multiple readings of the low and high frequency data patterns. These multiple readings allow the variable gain register settings on line 254 to stabilize or settle for accurate reading. Preferably, each data pattern is read about 50 times in a row to ensure that the variable gain register reading on line 254 has stabilized. In yet a further preferred arrangement, the low frequency data pattern comprises an 8T data pattern and the high frequency data pattern comprises a 2T data pattern.

The second control portion 270 preferably selects the operational pole setting 263 to provide the adjustable low pass filter 238 with a cutoff frequency that is at the Nyquist Frequency Limit $F_{Nyquist}$ for the higher frequency data pattern. In yet another preferred arrangement, the filter characteristics 264 relates operational boost settings to a ratio between first and second variable gain register settings as illustrated in FIG. 8.

The adjustable low pass filter 238 is preferably a continuous time filter and the operational boost setting 262 and the operational pole setting 263 are preferably continuous time filter settings. In a preferred arrangement, the second control portion 270 also connects to taps 290 of the FIR filter 242 to provide tap settings to the FIR filter 242. The tap settings control the frequency response of the FIR filter 242. The frequency response of the FIR filter 242 is preferably as described below in connection with FIG. 7.

With the arrangement illustrated in FIGS. 4–5, the operational boost setting 262 and the operational pole setting 263 are automatically selected without need for measurement of bit error rate data of the disc drive 204.

Figure 6:
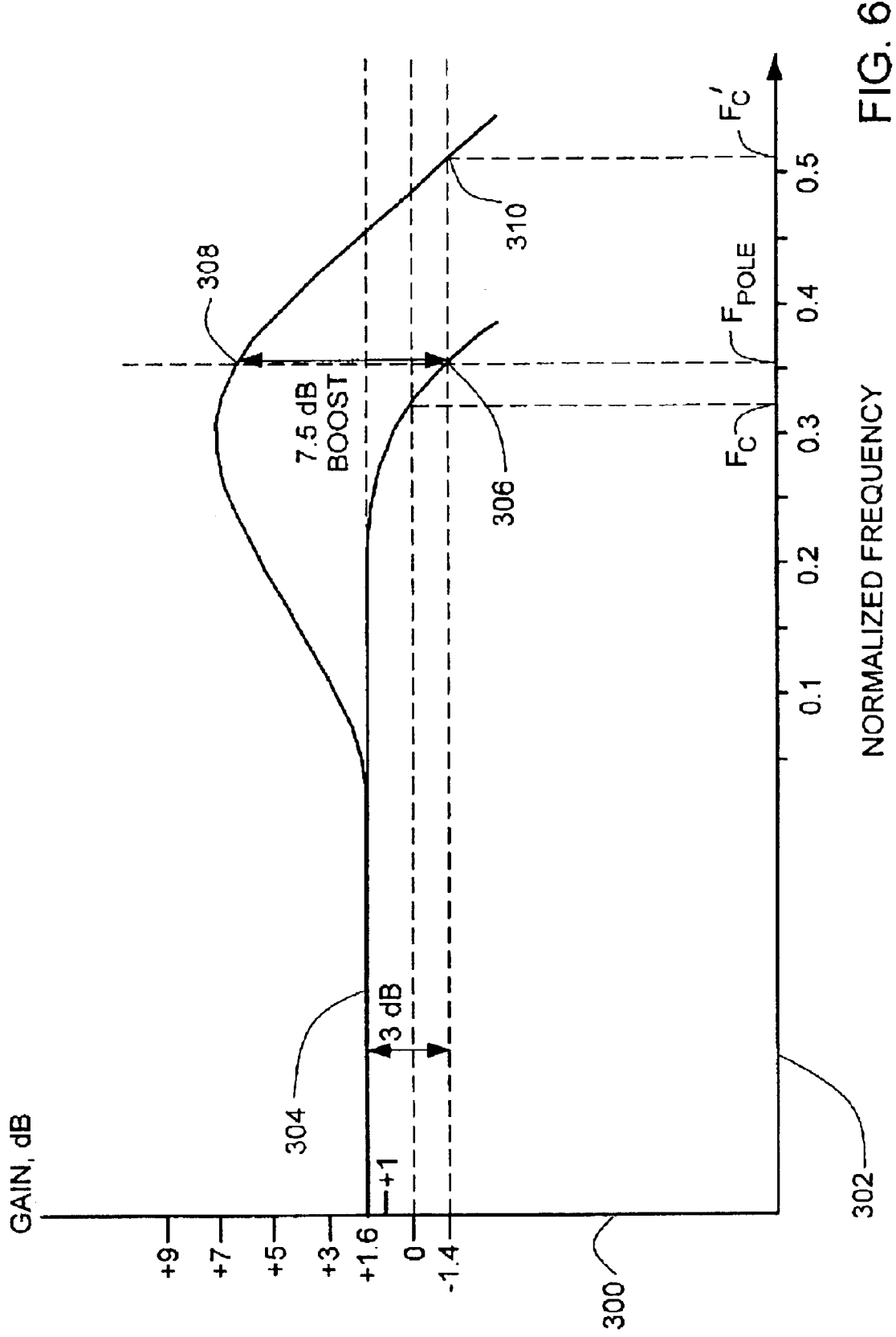
FIG. 6 illustrates a transfer function of an adjustable low pass filter.

FIG. 6 illustrates an exemplary adjustable transfer function of an adjustable low pass filter such as adjustable low pass filter 238 in FIG. 5. The adjustable low pass filter is preferably a continuous time filter (CTF) and preferably of a type known as a 4th order Butterworth filter. In FIG. 6, a vertical axis 300 represents filter gain in decibels (dB) and a horizontal axis 302 represents normalized frequency. The transfer function can take on different adjustable shapes depending on a setting of the amount of boost or the filter. The filter is a low pass filter, and the frequency characteristics at lower frequencies for all boost settings is relatively flat as indicated at 304. At normalized frequencies that are higher than about 0.1, the shape of the gain transfer function is dependent on the boost setting. When the boost setting is zero (no boost), then the gain transfer function rolls off smoothly without any overshoot as indicated at 306 and has a −3 dB cutoff frequency indicated by $F_C$. When the boost setting is set to +7.5 dB (a non-zero amount of boost), then there is considerable overshoot as indicated at 308 and the −3 dB cutoff frequency is at a higher frequency $F_C'$ as indicated at 310. When the boost is zero, the filter has a constant gain within its passband frequency. However, when the boost is not zero, the gain of the filter in the passband is a function of the frequency. The gain at high frequency is higher than that at the low frequency when the boost is not zero. The boost is defined as the amount of gain at the filter pole frequency $F_{POLE}$. Two examples of transfer functions are illustrated in FIG. 6, however, it will be understood that there are a large number of shapes that can be selected by selecting a boost setting.

The amount of operational boost that is set depends on an amount of equalization required by the read back waveform such that it matches the target needed by the read channel for optimum performance of the viterbi detector. From the perspective of the filter performance, boost is the gain difference between the high and low frequency components. Using the gain ratio obtained from a variable gain amplifier (such as amplifier 234 in FIG. 5), the amount of boost required by the system is preferably calculated as described below in connection with FIG. 8.

Figure 7:
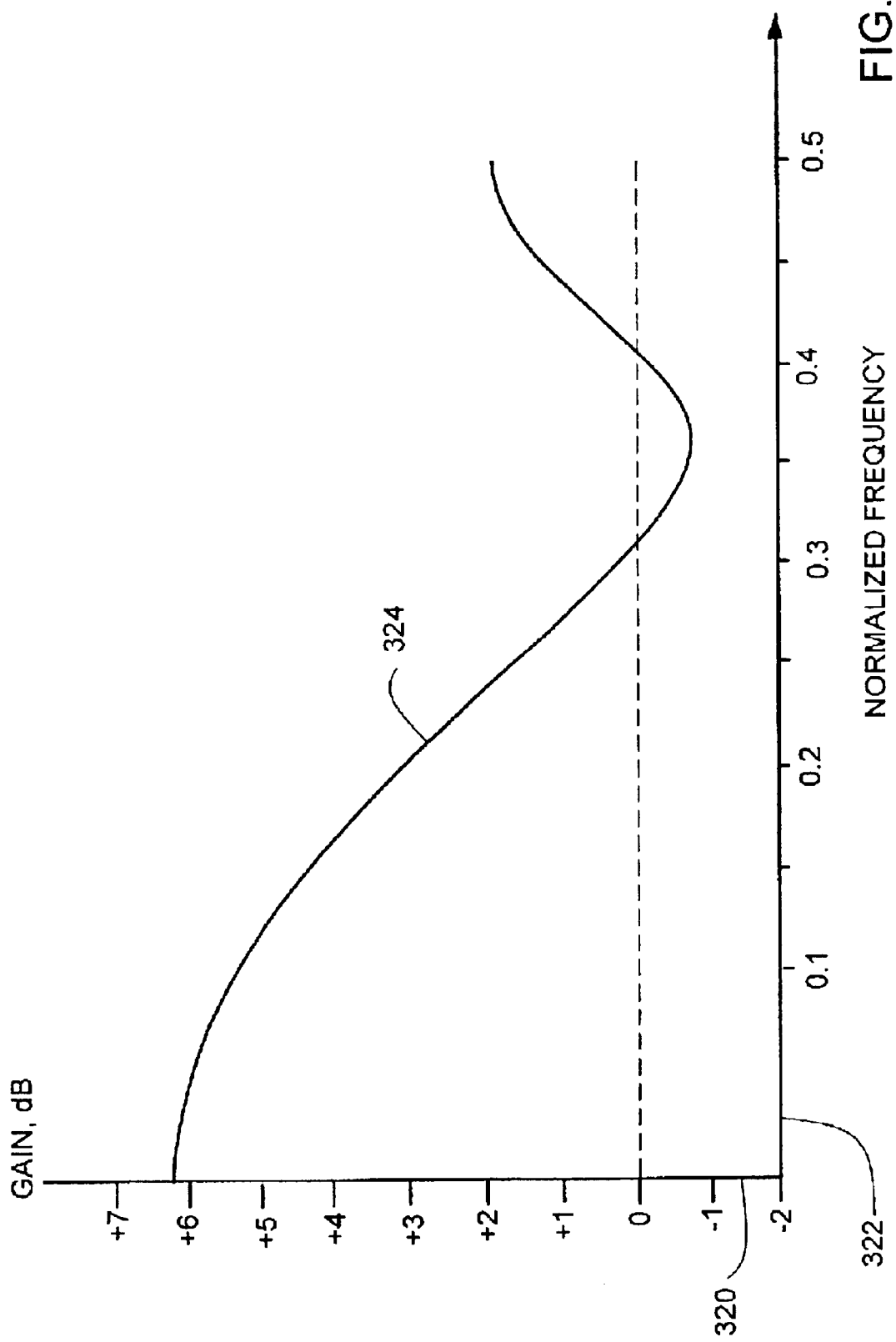
FIG. 7 illustrates a transfer function of a finite impulse response filter.

FIG. 7 illustrates an exemplary transfer function of a finite impulse response filter such as filter 242 in FIG. 5. In FIG. 7, a vertical axis 320 represents gain of the FIR filter in decibels (dB) and a horizontal axis 322 represents normalized frequency. The gain transfer function of the FIR filter is illustrated at 324. In a preferred arrangement, the adjustable taps of the FIR filter are set to provide the shape shown at 324 in FIG. 7 which is based on filter characteristics for a large quantity of the type of disc drive being adjusted.

FIG. 8 illustrates a relationship between a boost and a variable gain amplifier gain ratio for 2T and 8T frequency data patterns based on filter characteristics. A vertical axis 330 represents an amount of operational boost in decibels (dB) and a horizontal axis 332 represents a gain ratio of a first gain setting of a variable gain amplifier when a 2T frequency data pattern is read to a second gain setting of the variable gain amplifier when an 8T frequency data pattern is read. A series of dots 334 represent gain ratio data points and a dashed line 336 represents a regression line for the gain ratio data points. Filter characteristics, such as filter characteristics 264 in FIG. 4, can be either the data points or the regression line. The data points are preferred when computation time is more limited, and the regression line is preferred when data storage space is more limited.

FIG. 9 illustrates a ratio $F_{pole}/F_{synth}$ as a function of an operational boost setting such as determined, for example by data in FIG. 8. A vertical axis 340 represents a ratio of frequencies $F_{pole}/F_{synth}$ for the low pass filter and a horizontal axis 342 represents the boost of the low pass filter in decibels (dB). The plot in FIG. 9 shows $F_{boost}$ and $F_{pole}$ pairs such that the $F_c$ is equal to $F_{Nyquist}$. This relationship can also be obtained by mathematically solving the transfer function of the low pass filter mathematically. This relationship can be determined graphically by plotting the transfer function of the low pass filter for a particular boost setting, and then adjusting $F_{pole}$ such that the $F_c$ is at $F_{Nyquist}$. This process is repeated for all possible boost setting.

The frequency $F_{Nyquist}$ is equal to half the frequency of the highest useful data frequency in the channel. Since the signals with frequency higher than the Nyquist frequency, $F_{Nyquist}$ (with normalized cutoff frequency is 0.5) will no longer contain useful information after filtering, the cutoff frequency of the low pass filter is set at $F_{Nyquist}$. However, it can be seen from FIG. 6 that, for a particular pole frequency, the cutoff frequency of the filter depends on the boost setting. The cutoff frequency is shifted from Fc to Fc' if the boost is increased from zero to 7.5 dB. Hence the pole frequency, Fpole of the filter is selected as such that after including the boost, the Fc is equal to the FNyquist.

Figure 10:
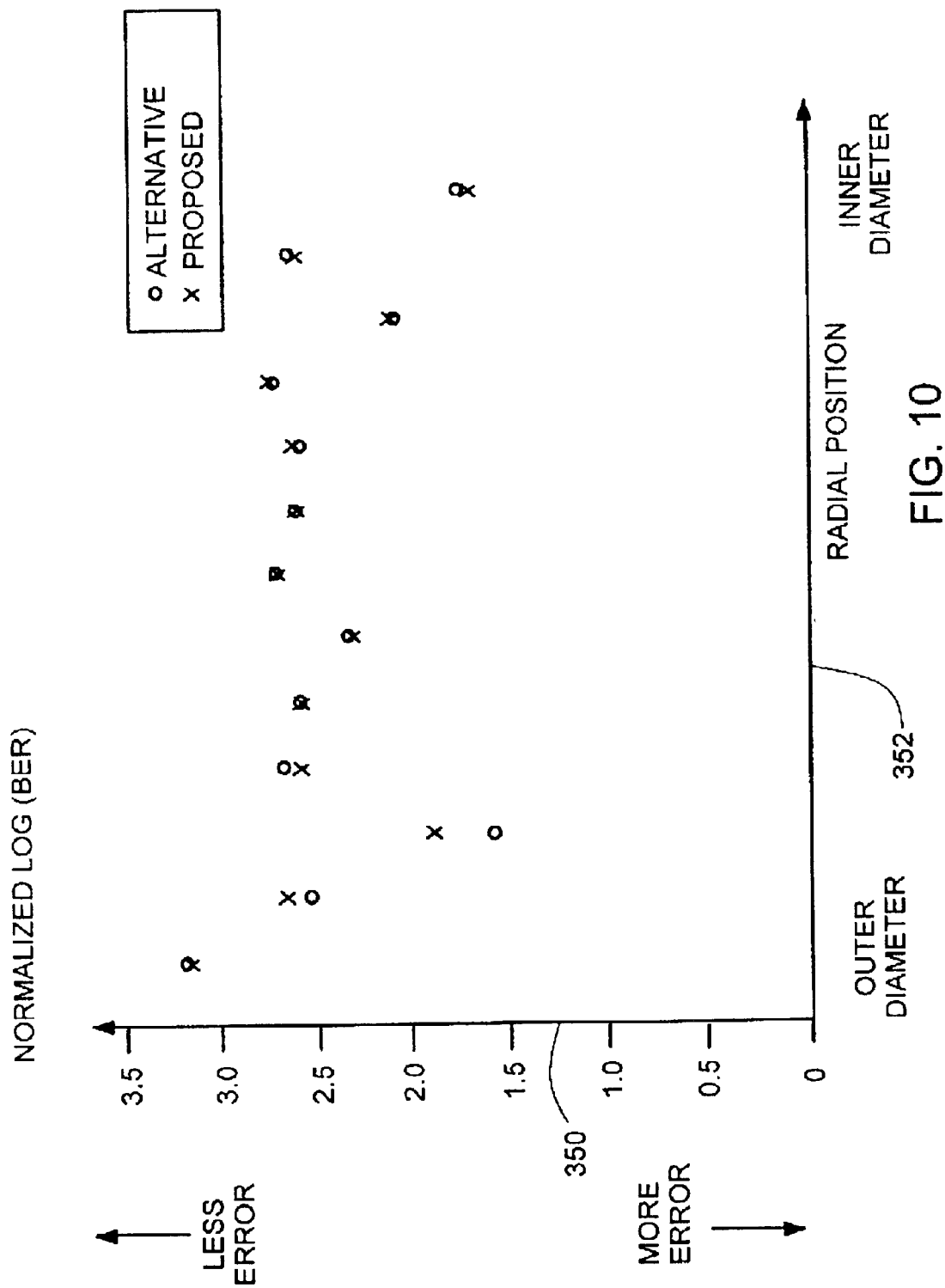
FIG. 10 illustrates bit error rates using the disclosed method and a method in a first exemplary type of disc drive.
Figure 11:
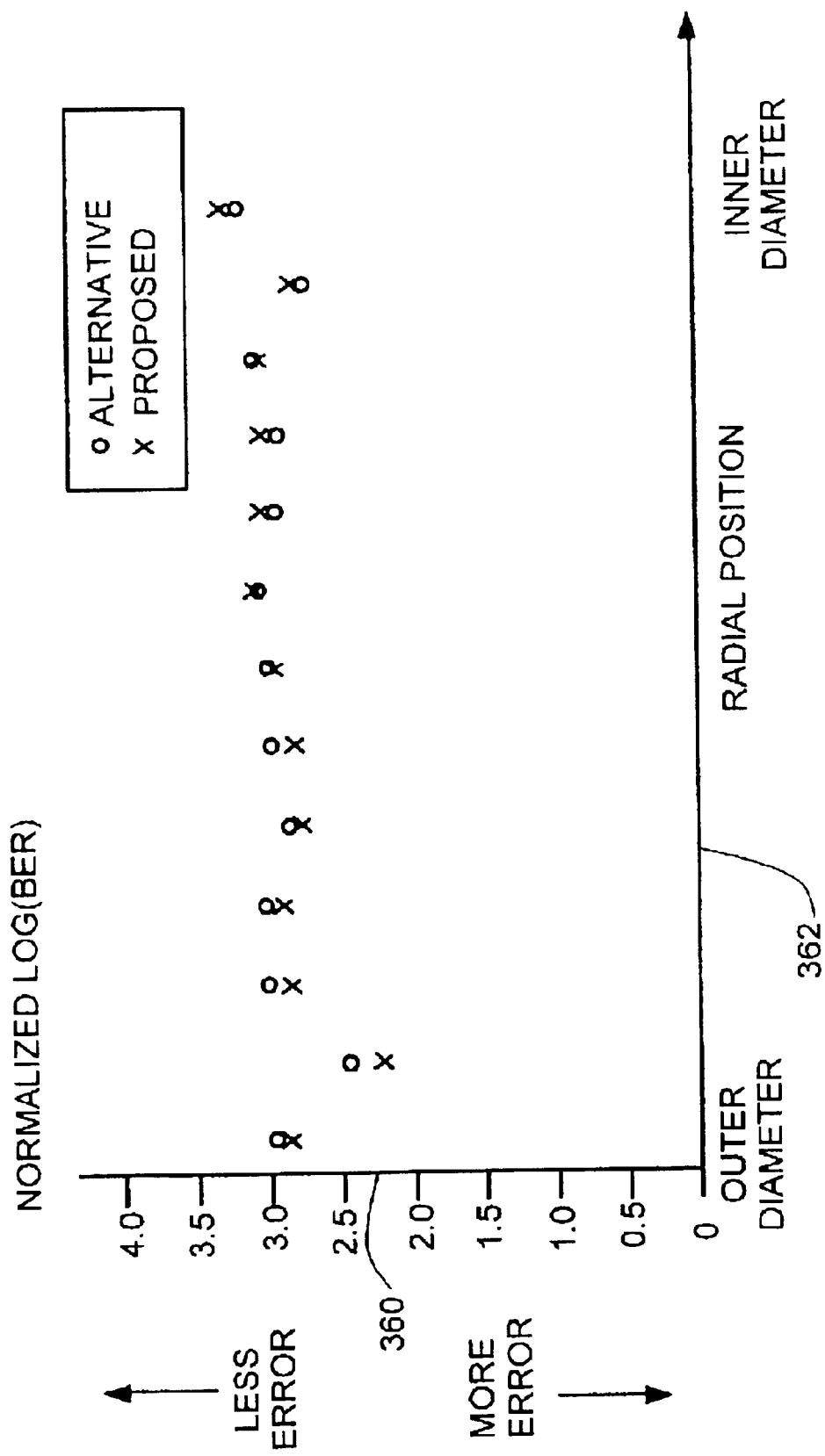
FIG. 11 illustrates bit error rates using the disclosed method and a method in a second exemplary type of disc drive.

FIGS. 10–11 illustrate bit error rates using the proposed arrangement (indicates by "X" data points) and alternative methods (indicated by "O" data points). In FIGS. 10–11, vertical axes 350, 360 represent raw bit error rates (before use of error correction algorithms), and horizontal axes 352, 362 represent zone numbers (locations on the disc being read). FIG. 10 shows bit error rates for one type of drive, and FIG. 11 shows bit error rates for another type of drive. It can be seen by inspection of FIGS. 10–11 that, In term of bit error rate, the proposed method shown here gives similar results to the more time consuming "direct" alternate methods described above in connection with FIG. 2. The proposed method does not require any default value to be set prior to the optimization process. This advantage enables the time for optimizing Fpole and Fb to be shortened significantly compared to the alternative method.

Figure 12:
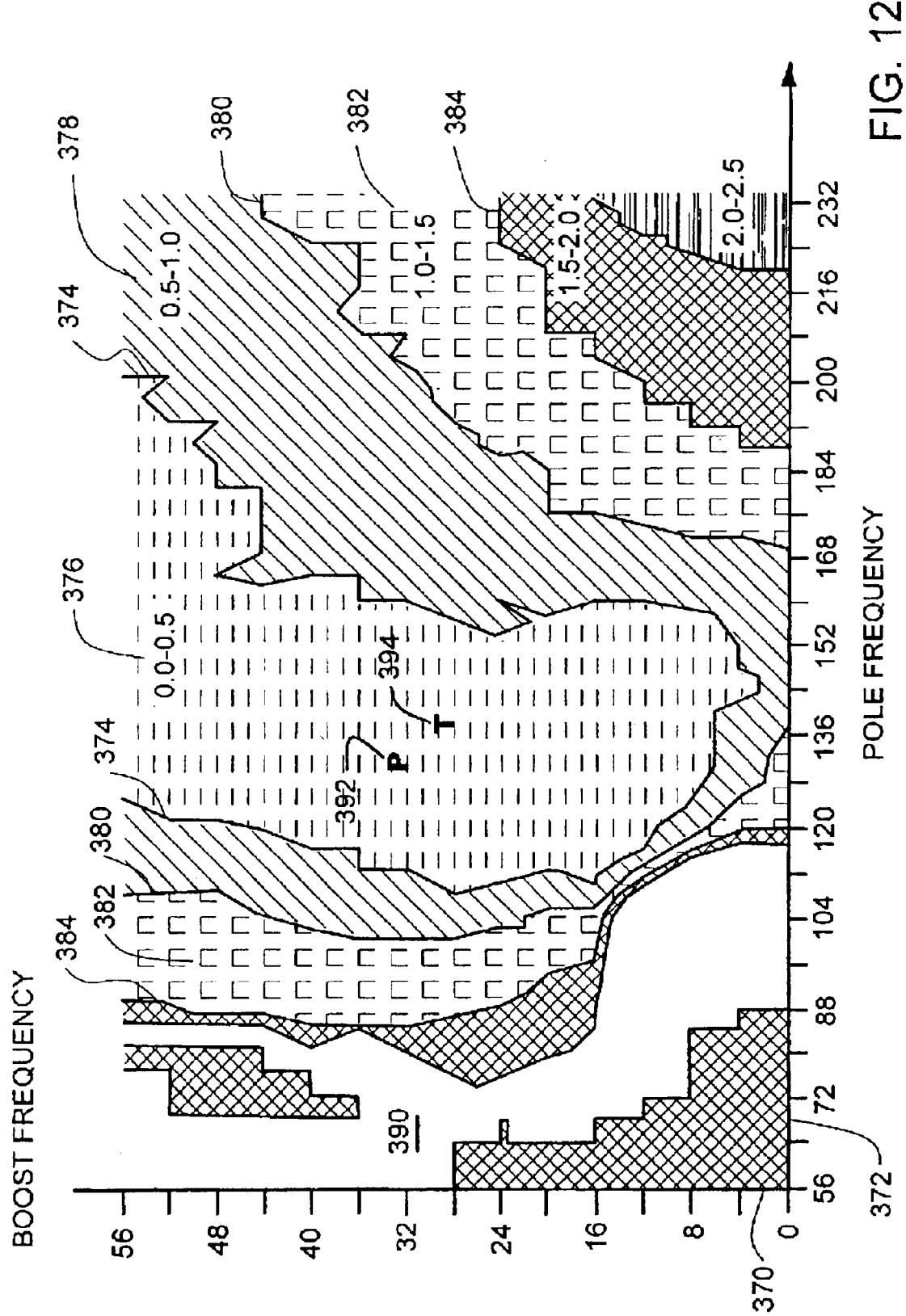
FIG. 12 illustrates operational pole and boost setting for the disclosed method and a method superimposed on a map of isobars of bit error rate.

FIG. 12 illustrates operational pole and boost setting for the disclosed arrangement and the alternative method on a map of isobars of bit error rate. In FIG. 12, a vertical axis 370 represents a boost frequency and a horizontal axis 372 represents a pole frequency for an adjustable low pass filter. A first isobar line 374 indicates a line along which the bit error rate is equal to 0.5. A first region 376 generally surrounded by the first isobar 374 has bit error rates in the range of 0.0–0.5. A second region 378 has bit error rates in the range of 0.5 to 1.0 and is bounded by the first isobar 374 and a second isobar 380 with a bit error rate of 1.0. A third (noncontiguous) region 382 is bounded by the second isobar 380 and a third (noncontiguous) isobar 384 with a bit error rate of 1.5. Other isobars are also illustrated in FIG. 12. There is also a region 390 where bit error rate changes so rapidly as a function of boost frequency or pole frequency that the data is not useful. FIG. 12 shows the contour plot of the BER for all possible Fpole and Fb. An operational pole and operational boost setting selected using the method proposed here is shown by a letter "P" at 390. An operational pole and operation boost setting using the alternate "direct" method is shown by a letter T at 394. It can be seen that the proposed method and the more time consuming alternate method result in similar locations for the pole and boost settings.

In summary, a method (such as shown in FIG. 3) and a channel adjustment control (such as 200) are shown for adjusting a channel (such as read channel 202) of a disc drive (such as 204) to reduce bit error rate. The channel adjustment control comprises a first control portion (such as 260) that reads variable gain register settings (such as on line 254) in the channel, and that provides an operational boost setting (such as 262) for an adjustable low pass filter (such as 238) in the channel. The first control portion adjusts the operational boost setting by comparing variable gain register settings to filter characteristics (such as 264).

The channel adjustment control also includes a second control portion (such as 270) that provides an operational pole setting (such as 263) for the adjustable low pass filter. The channel adjustment control adjusts the operational pole setting based on the operational boost setting and known parameters (such as 282) of the adjustable low pass filter.

The channel adjustment control also includes a third control portion (such as 284) that applies low and high frequency data patterns (such as 210 from a disc drive) while the first control portion reads the variable gain register settings.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the channel adjustment control while maintaining substantially the same functionality without departing from the scope of the present invention. In addition, although the preferred embodiment described herein is directed to a firmware system for channel adjustment control, it will be appreciated by those skilled in the art that the teachings of the present invention can be applied to channel adjustment controls that are realized with any combination of hardware, firmware software, standard or custom integrated circuits or microprocessor systems, without departing from the scope of the present invention.

What is claimed is:

1. A channel, comprising:
   a variable gain amplifier, and an automatically controlled variable gain register controlling a gain of the variable gain amplifier;
   an adjustable low pass filter, and boost and pole frequency registers controlling boost and pole frequency settings of the adjustable low pass amplifier;
   a channel adjustment control that:
      reads the variable gain register values while low and high frequency data patterns are applied to the channel, and that writes an operational boost register setting as a function of comparing the variable gain register values to filter characteristics; and
      writes an operational pole frequency setting to the pole frequency register based on the operational boost register setting and known parameters of the adjustable low pass filter.

2. The channel of claim 1 wherein the channel is a read channel in a data storage system.

3. The channel of claim 2 wherein the data storage system is a disc drive.

4. The channel of claim 1 wherein the channel adjustment control writes temporary settings to the boost and pole frequency registers to provide a flat, maximum bandwidth response while the low and high frequency data patterns are applied.

5. The channel of claim 1 wherein the channel adjustment circuit reads the variable gain register after multiple applications of the low and high frequency data patterns.

6. The channel of claim 1 wherein the low frequency data pattern comprises an 8T pattern and the high frequency data pattern comprises a 2T pattern.

7. The channel of claim 1 wherein the channel adjustment control sets the operational setting of the pole frequency register to provide the adjustable low pass filter with a cutoff frequency that is at the Nyquist Frequency Limit $F_{Nyquist}$ for the higher frequency data pattern.

8. The channel of claim 1 wherein the filter characteristics relates operational boost settings to a ratio between first and second variable gain register settings.

9. The channel of claim 1 wherein the adjustable low pass filter comprises a continuous time filter, and the operational boost setting and the operational pole setting set continuous time filter settings.

10. The channel of claim 1 wherein the channel adjustment control also provides tap settings for a finite impulse response filter in the channel.

11. The channel of claim 1 wherein the operational boost setting and the operational pole frequency setting are automatically selected without measurement of bit error rate data.

12. A channel, comprising:
   low and high frequency data patterns for application to a channel input;
   a channel adjustment control including:
   a first control portion that reads first and second variable gain register settings, and that writes an operational boost setting to a boost register, the first control portion adjusting the operational boost setting based on a comparison of the first and second variable gain register settings to stored filter characteristics relating first and second variable gain register settings to operational boost settings;
   a second control portion that writes a test boost setting and a test pole setting during a test interval, and that writes an operational boost setting and an operational pole setting after the test interval, the second control portion setting the operational pole setting based on known parameters of the adjustable low pass filter; and
   a third control portion that controls application of the first and second frequency data patterns while the first control portion reads the first and second variable gain register settings, respectively, during the test interval, and that controls the channel adjustment control after the test interval to provide the operational boost setting and the operational pole settings to the boost and pole frequency registers.

13. The channel of claim 12 wherein the channel is a read channel in a data storage system.

14. The channel of claim 13 wherein the data storage system is a disc drive.

15. The channel of claim 12 wherein the channel adjustment control adjusts the adjustable low pass filter to provide a flat, maximum bandwidth response while the low and high frequency data patterns are applied.

16. The channel of claim 12 wherein the first control portion reads the variable gain register settings after multiple applications of the low and high frequency data patterns.

17. The channel of claim 12 wherein the channel provides an 8T pattern as the low frequency data pattern and provides a 2T pattern as the high frequency data pattern.

18. The channel of claim 12 wherein the channel adjustment control sets the pole frequency register to provide the adjustable low pass filter with a cutoff frequency that is at the Nyquist Frequency Limit $F_{Nyquist}$ for the higher frequency data pattern.

19. The channel of claim 12 wherein the filter characteristics relates operational boost settings to a ratio between first and second variable gain register settings.

20. The channel of claim 12 wherein the adjustable low pass filter is a continuous time filter and the operational boost register setting and the operational pole register setting are continuous time filter settings.

21. The channel of claim 12 wherein the channel adjustment control also provides tap settings to a finite impulse response filter in the channel.

22. The channel of claim 12 wherein the operational boost register setting and the operational pole frequency register setting are automatically selected without measurement of bit error rate data.

23. A method of adjusting a channel to reduce bit error rate, comprising:
   setting a boost register to a test boost register setting and setting a pole frequency register to a test pole frequency setting for an adjustable low pass filter;
   providing lower and higher frequency data patterns to the channel, and reading first and second variable gain register settings in the channel during the lower and higher frequency data pattern readings, respectively;
   setting the boost register to an operational boost register setting based on filter characteristics relating operational boost register settings with first and second variable gain register settings; and
   adjusting the pole frequency register to an operational pole frequency register setting based on the operational boost register setting and known parameters of the adjustable low pass filter to provide a reduced bit error rate.

24. The method of claim 23 wherein the channel is a read channel in a data storage system.

25. The method of claim 24 wherein the data storage system is a disc drive.

26. The method of claim 23 wherein the adjustable low pass filter is temporarily adjusted to provide a flat, maximum bandwidth response while the low and high frequency data patterns are applied.

27. The method of claim 23 wherein the channel adjustment control reads the first and second variable gain register settings from the variable gain register after the multiple applications of the low and high frequency data patterns.

28. The method of claim 23 wherein the low frequency data pattern comprises an 8T pattern and the high frequency data pattern comprises a 2T pattern.

29. The method of claim 23 wherein the adjusting of the operational pole setting comprises:

selecting the operational pole setting to provide the adjustable low pass filter with a cutoff frequency that is at the Nyquist Frequency Limit $F_{Nyquist}$ for the higher frequency data pattern.

30. The method of claim 23 wherein the filter characteristics relates operational boost register settings to a ratio between first and second variable gain register settings.

31. The method of claim 23 wherein the adjustable low pass filter is a continuous time filter and the operational boost register setting and the operational pole frequency register settings are continuous time filter settings.

32. The method of claim 23 wherein the channel adjustment control also provides tap settings to a finite impulse response filter in the channel.

33. The method of claim 23 wherein the operational boost register setting and the operational pole register setting are automatically selected without measurement of bit error rate data.

34. A channel adjustment control, comprising:

a first channel adjustment control that reads variable gain register values for a variable gain amplifier in a channel while low and high frequency data patterns are applied to the channel, and that writes an operational boost register setting for an adjustable low pass filter in the channel as a function of comparing the variable gain register values to filter characteristics; and a second channel adjustment control portion that writes an operational pole frequency setting to a pole frequency register for the low pass filter based on the operational boost register setting and known parameters of the adjustable low pass filter.

35. The channel of claim 34 wherein the channel is a read channel in a data storage system.

36. The channel of claim 35 wherein the data storage system is a disc drive.

37. A method of adjusting a channel to reduce bit error rate, comprising:

setting filter registers controlling an adjustable low pass filter in the channel to test settings;

providing multiple frequency data patterns to the channel, and reading variable gain register settings; and setting the filter registers to operational register settings based on filter characteristics and the variable gain register settings to provide a reduced bit error rate for the channel.

38. The method of claim 37 wherein the channel is a read channel in a data storage system.

39. The method of claim 38 wherein the data storage system is a disc drive.

* * * * *